UNITED STATES PATENT OFFICE.

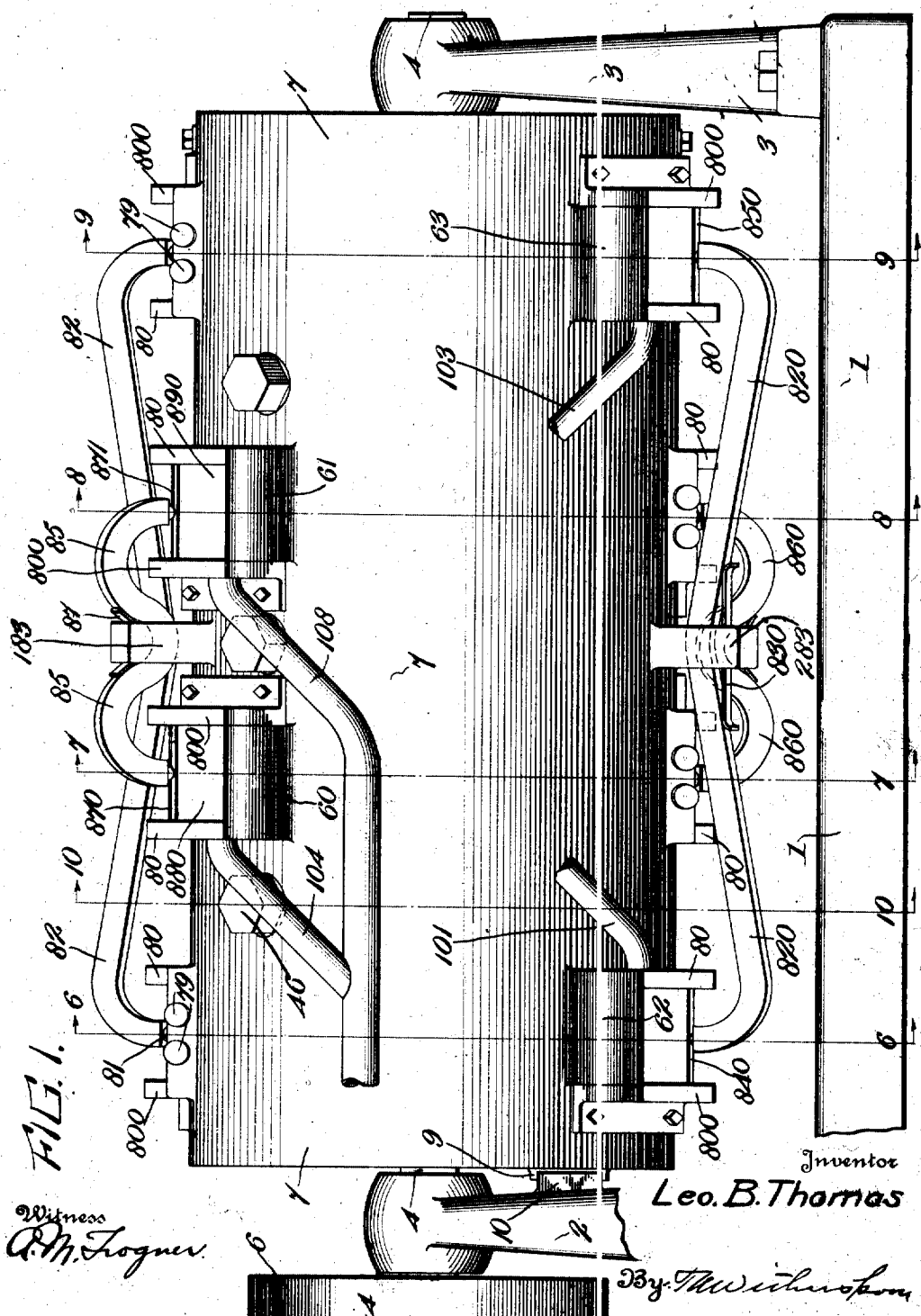

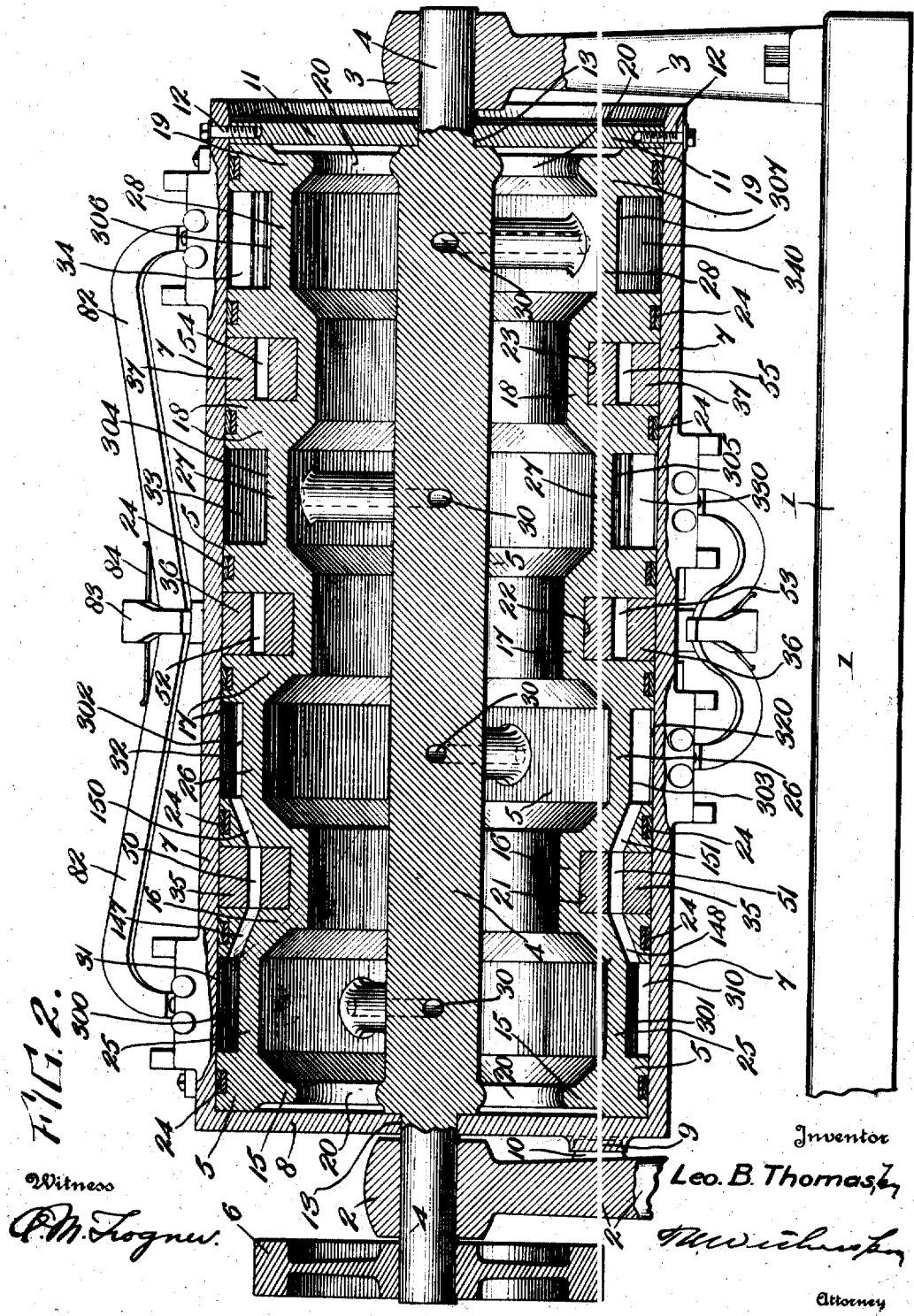

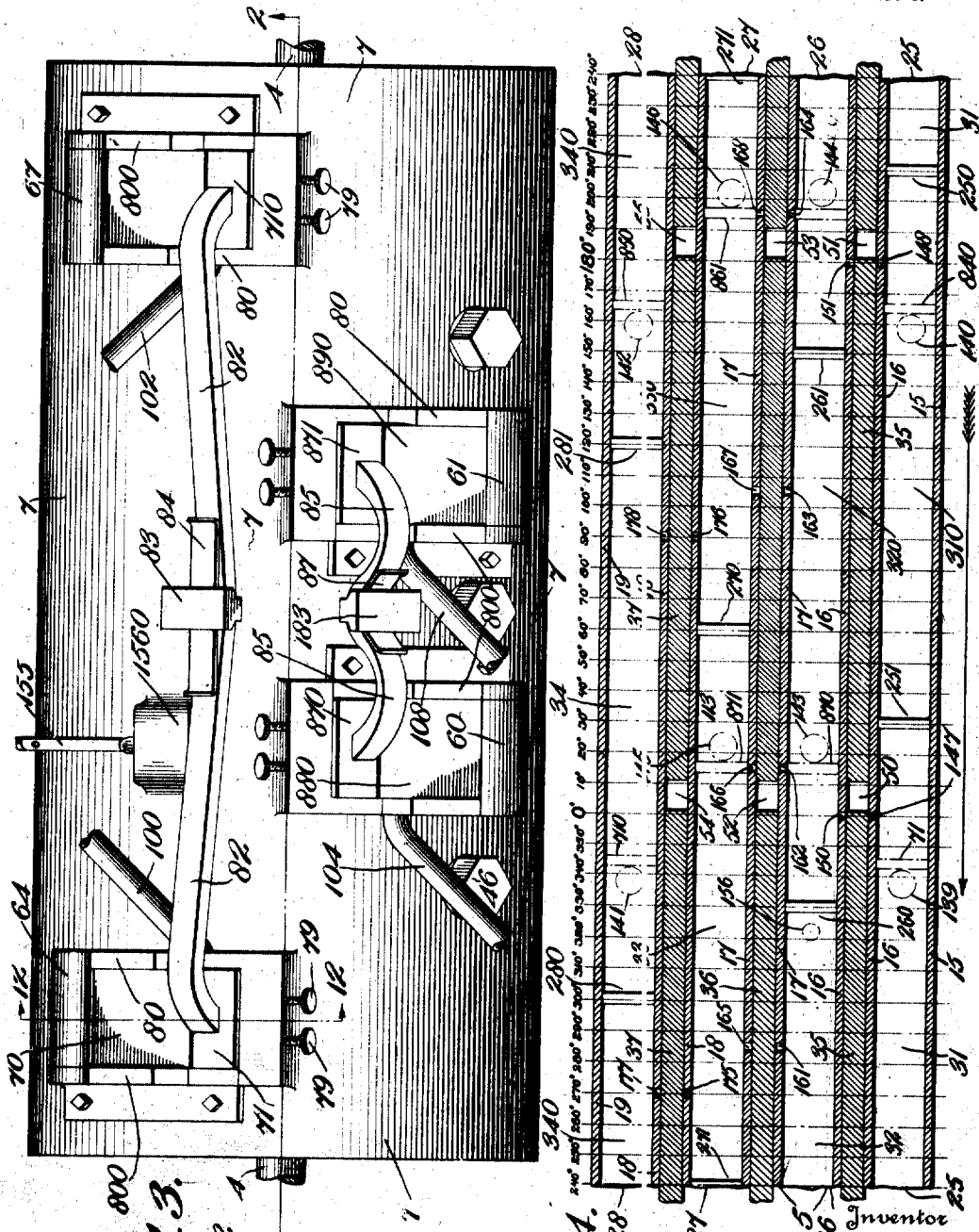

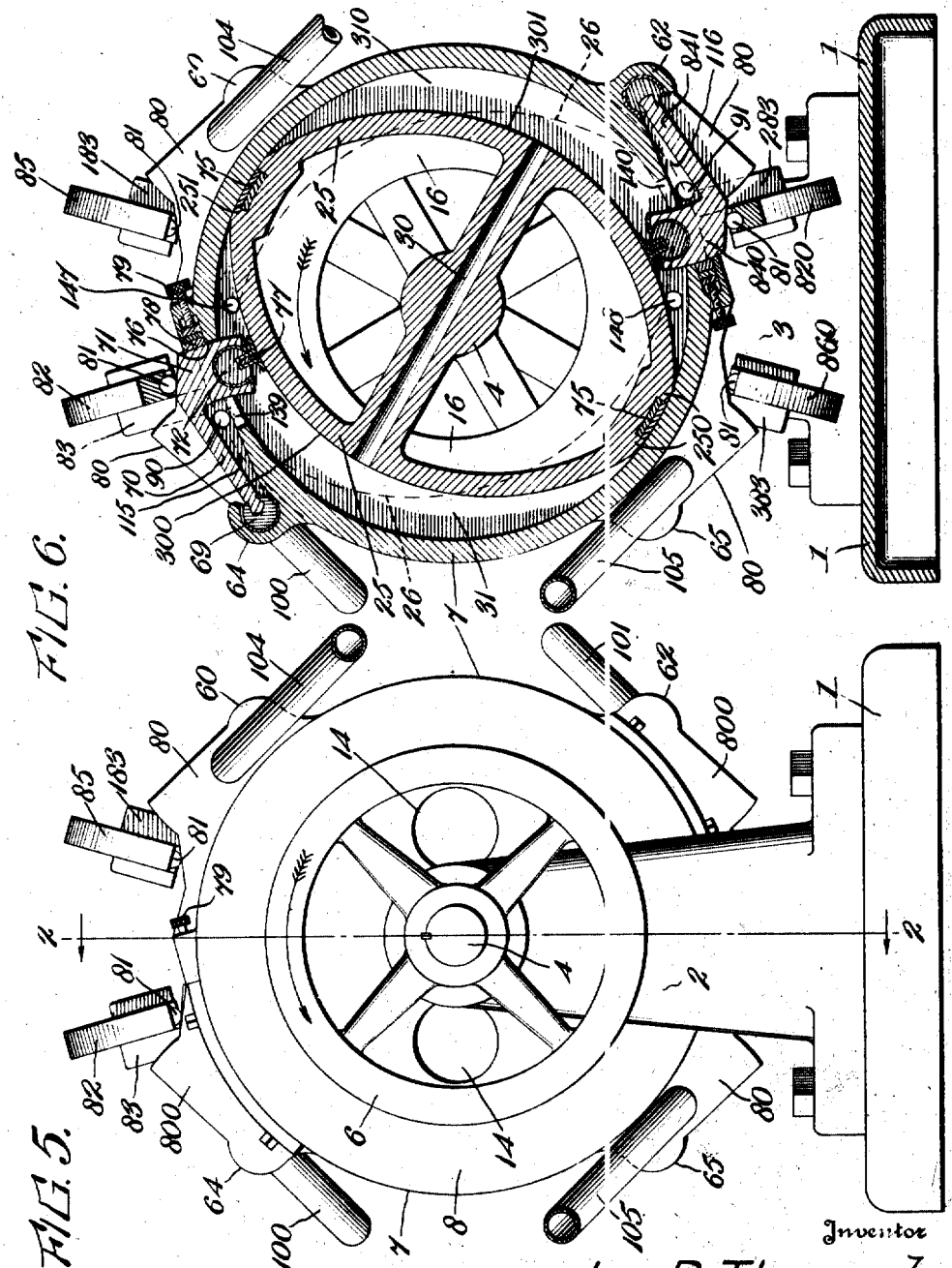

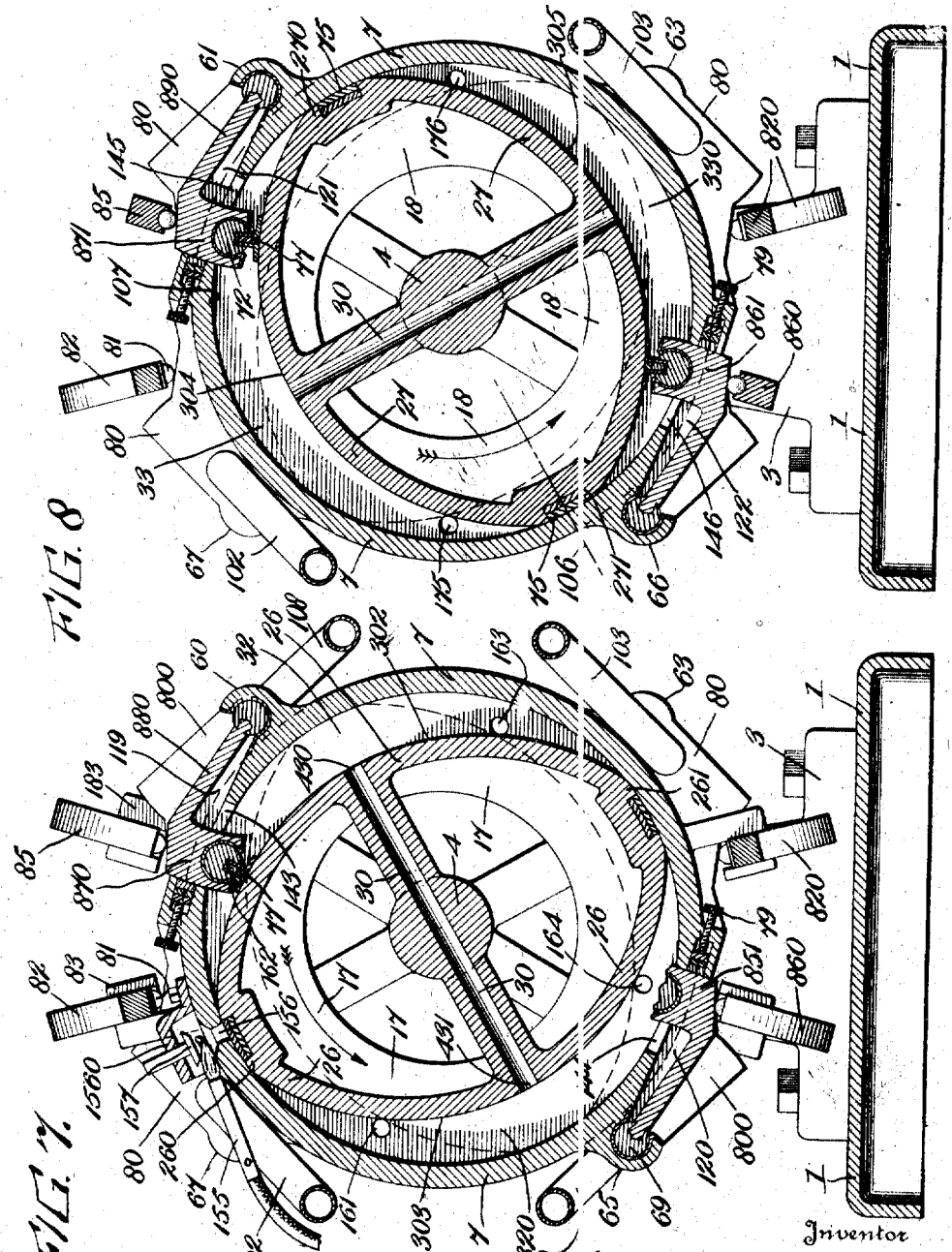

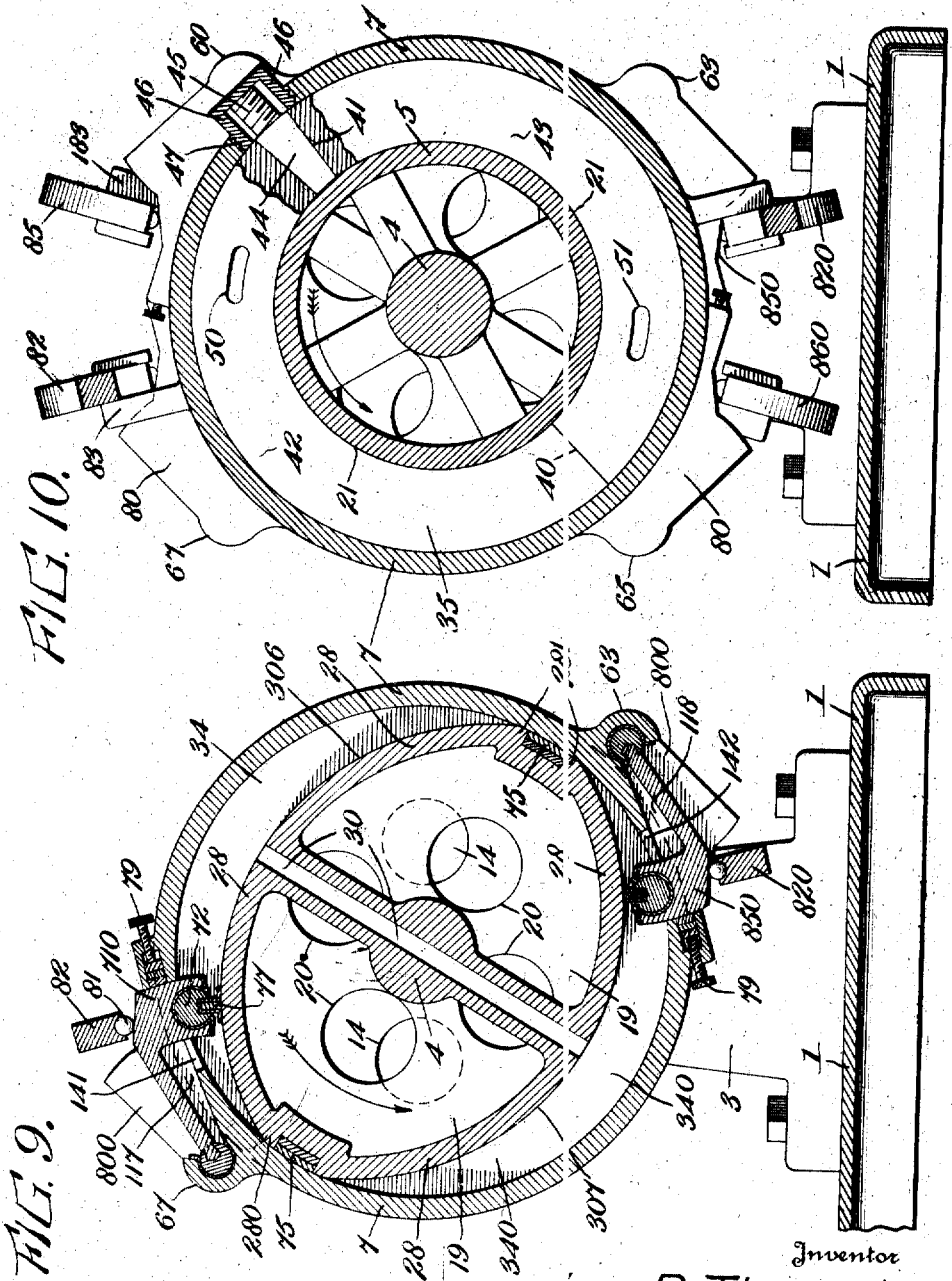

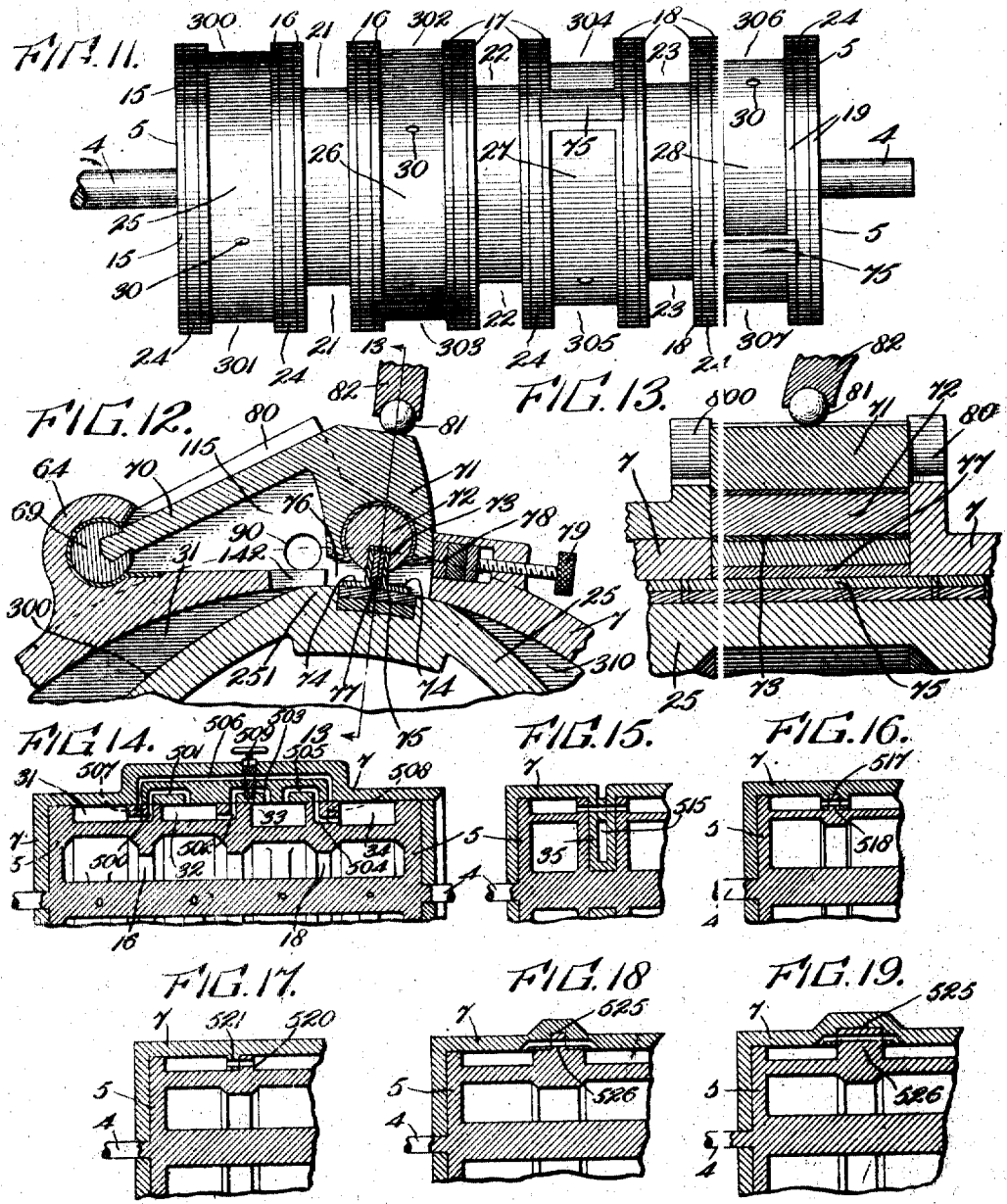

LEO B. THOMAS, OF PORT CHESTER, NEW YORK.

ROTARY ENGINE.

1,216,378.  Specification of Letters Patent.  Patented Feb. 20, 1917.

Application filed January 18, 1916. Serial No. 72,777.

*To all whom it may concern:*

Be it known that I, LEO B. THOMAS, a citizen of the United States, residing at Port Chester, in the county of Westchester and State of New York, have invented certain new and useful Improvements in Rotary Engines; and I do hereby declare the following to be a full, clear, and exact description of the invention, such as will enable others skilled in the art to which it appertains to make and use the same.

This invention relates to internal combustion engines, and has for its object to improve such engines in a number of ways, especially in regard to providing a plurality of compression chambers, a plurality of firing chambers, an improved means for igniting the fuel, in providing an improved rotary piston and connections, as well as in other particulars that will more fully appear hereinafter.

With these objects in view the invention consists in the novel details of construction and combinations of parts more fully hereinafter disclosed and particularly pointed out in the claims.

Referring to the accompanying drawings forming a part of this specification in which like numerals designate like parts in all the views:—

Figure 1 is a side elevational view of an engine made in accordance with my invention;

Fig. 2 is a longitudinal vertical sectional view taken on the line 2—2 of Fig. 3 of the parts shown in Fig. 1, and looking in the direction of the arrows;

Fig. 3 is a top plan view of the parts shown in Fig. 1;

Fig. 4 is a diagrammatic sectional development of certain of the working parts of the motor, illustrating its principles of operation;

Fig. 5 is an end elevational view of the parts shown in Fig. 1, as seen from the left of said figure;

Figs. 6, 7, 8, 9 and 10 are cross sectional views taken respectively on the lines 6—6, 7—7, 8—8, 9—9, and 10—10 of Fig. 1, looking in the direction of the arrows;

Fig. 11 is a detail elevational view of the rotor of the motor;

Fig. 12 is an enlarged detail sectional view of one of the oscillating abutments, taken on the line 12—12 of Fig. 3;

Fig. 13 is a detail sectional view taken on the line 13—13 of Fig. 12;

Fig. 14 is a diagrammatic sectional view of a modified form of the invention suitable for use as a reversible engine; and Figs. 15, 16, 17, 18 and 19 are diagrammatic sectional views illustrating further modified forms of the invention.

1 designates any suitable base, provided with the bearing standards 2 and 3, in which is journaled the shaft 4, carrying the rotor 5 and provided at one end with a suitable pulley 6. Surrounding the rotor 5 is the stator or casing 7 having an integral end or head 8, provided with a lug 9 adapted to engage a pair of similar lugs 10 on the bearing standard 2, whereby rotation of the said casing 7 is prevented. The opposite end of the stator 7 is provided with a removable head 11, normally held in place by any suitable means, such as the bolts 12. Both of the heads 8 and 11 are provided with centrally located openings 13 to accommodate the shaft 4 and they are further provided with additional openings 14, see Figs. 5 and 9, for the admission of cooling air to the rotor, as will be more fully disclosed below.

The rotor 5 may be constructed in any suitable manner, but I prefer to make it in the form of a casting having the end walls 15 and 19 and the internally extending ribs 16, 17 and 18, as will be clear from Figs. 2 and 11 of the drawings.

That is to say, between the end walls 15 and 19 there are provided a plurality of annular ribs 16, 17, and 18 which separate the elliptical pistons about to be described, and each rib is provided with a deep groove such as 21, 22 and 23, and on each side of each deep groove each rib is further provided with shallow grooves, in which are located the packing rings 24 all as will presently appear.

The end walls 15 and 19 are integrally connected with the shaft 4 and are provided with suitable openings 20 to permit the free circulation of the cooling air, all as will be clear from Figs. 2 and 9.

Between the end wall 15 and the rib 16 I provide a pair of oppositely disposed crescent shaped grooves 300 and 301 and thereby form an elliptical piston 25, integral with the said wall 15 and rib 16, as will be clear from Figs. 2, 6 and 11. Like 110 manner, a second elliptical piston 26 is formed integral with the ribs 16 and 17 by cutting a pair of crescent-shaped grooves 302 and 303 between the said ribs, while similar pistons 27 and 28 are formed by pairs of crescent-shaped grooves 304 and 305 and 306 and 307, between the ribs 17 and 18 and the rib 18 and end wall 19, respectively as shown.

The said grooves 300, 301, 302, 303, 304, 305, 306 and 307 are so positioned that the major or longer axis of the piston 25 is at substantially right angles to the corresponding axis of the piston 28, while the major axis of the piston 26 also makes a right angle with the major axis of the piston 27, see Figs. 6, 7, 8 and 9. Each of the pistons 25, 26, 27 and 28 is provided along its minor axis with a duct or passage 30, the purpose of which is to permit the equalization of the pressure on both sides of the pistons, as will be more fully disclosed below.

The bore of the stator 7 is preferably uniform throughout, and its surface taken in conjunction with the grooves 300 and 301 of the rotor 5 forms a pair of chambers 31 and 310, see Figs. 2 and 6. In like manner similar pairs of chambers 32 and 320 (see Fig. 7) 33 and 330, (see Fig. 8) and 34 and 340 (see Fig. 9) are formed by the smooth interior of the stator 7 and the pairs of crescent-shaped grooves 302 and 303, 304 and 305, and 306 and 307, respectively.

In other words, a pair of crescent-shaped chambers is provided for each of the pistons 25, 26, 27 and 28, the chambers 31, 310, 34 and 340 constituting compression chambers and the chambers 32, 320, 33 and 330 constituting explosion or working chambers, as will appear more fully below.

As above stated, the rib 16 of the rotor 5 is provided with the annular groove 21, which, as will now be clear, is located between the piston 25 and its chambers 31 and 310, and the piston 26 and its chambers 32 and 320. Located in the said groove 21 is a ring member 35, and in like manner a ring member 36 is located in the groove 22 of the rib 17, while a similar ring member 37 occupies the groove 23 with which the rib 18 is provided, all as will be clear from Fig. 2.

The ring member 35, see Fig. 10, is divided as at 40 and 41, into two sections 42 and 43, each of which sections extends over an arc of slightly less than 180°. The ends of the split 41 are preferably tapered slightly and are adapted to be engaged by a tapered plug 44, which forces the segments 42 and 43 tightly against the bore of the stator 7. This forcing of the ring segments against the inner circumference of the said stator has a tendency to prevent the rotation of the said segments, and such rotation is further prevented by the plug 44 itself, which projects through an opening 47 in the said stator 7. The projecting end of the said plug is screw-threaded as at 45, for engagement by a suitable instrument by means of which it may be withdrawn; and the said screw threaded end is normally covered by a suitable cap 46, screw threaded or otherwise secured in the opening 47 of the stator 7.

The ring segment 42 is provided with a suitable port or passage 50, extending entirely through said segment, while its companion segment 43 has a similar port 51, located at a point diametrically opposite to the port 50. The said ports 50 and 51 are adapted to register at certain times with similar ports formed in the rib 16 and thereby afford communication between the chambers 31 and 32, and 310 and 320, as will be more fully hereinafter described.

The ring members 36 and 37 are of a similar construction in every respect to the ring member 35, and are provided with ports 52 and 53, and 54 and 55, respectively, adapted to register with corresponding ports formed in the ribs 17 and 18, as will be clear from Figs. 2 and 4.

From the construction just disclosed it will be clear that the rings 35, 36 and 37 will at all times remain stationary with the stator 7. It will also be obvious that the said rings may, if desired, be cast integral with the said casing in the form of internally projecting ribs as is shown in Fig. 15.

At a suitable point in the rib 16, and extending from the chamber 31 to the groove 21, I provide a port 147, see Figs. 2 and 6, while at a diametrically opposite point in said rib and extending from the chamber 310 to the groove 21, I provide a similar port 148. At corresponding points on the other side of the rib 16 and extending from the chambers 32 and 320, respectively, to the groove 21, I provide the ports 150 and 151. It will be understood that the pairs of ports 147, 150 and 148, 151 are located in the same radial planes, so that both ports of a pair, 147 and 150 for example, will register simultaneously with a port, such as 50, in the ring member 35, and thereby afford direct communication between adjacent chambers, such as 31 and 32, see Figs. 2, 4 and 6.

In like manner the rib 18 as will presently appear in connection with Figs. 4 and 8 is provided with the ports 175, 176, 177 and 178, adapted to register with the ports 54 and 55, carried by the ring member 37, and to afford communication between the chambers 33 and 34, and 330 and 340, respectively.

The rib 17, however, instead of being provided with four ports is provided with eight ports 161, 162, 163, 164, 165, 166, 167 and 168, arranged in pairs in a manner similar to the ports in the ribs 16 and 18, and located approximately 90° apart, all as will presently appear in connection with Figs. 4 and 7. These said ports 161 to 168 are adapted to register at predetermined times with the ports 52 and 53, carried by the ring member 36, and to afford communication between the chambers 32 and 33, and 320 and 330, as will be clear from Figs. 4 and 7.

In order that this said Fig. 4 may be the more clearly understood it is said: This said figure is a development of the rotor 5, or a diagrammatic illustration of what would appear if one omitted the casing 7 and cut through the rotor 5 along the line 106 illustrated in Fig. 8, and then moved the upper portions of the said rotor 5 toward the top of the figure, around the point 107 as a center, and also moved the lower portion of the rotor 5 downwardly and upwardly around the same point 107 as a center, so as to spread out all of the parts into a flat sheet, and then looked down upon the parts, observing that the sectional parts appearing in Fig. 4 are not in all respects true as to form but only diagrammatic illustrations of the parts that are indicated by their respective numerals. The respective abutments and inlet and exhaust ports to be described and pertaining to the stator are shown in dotted lines.

Further the point 107 is marked 0°, and the point at which the line 106 severs the rotor is marked 240° on Fig. 4.

On the outside of the stator or casing 7 are located eight lugs 60, 61, 62, 63, 64, 65, 66 and 67, see Figs. 1, 3, 5, 6, 7, 8, 9, 10 and 12. All of these lugs with their associated parts are similar in construction and therefore the following description of one will apply to all.

Considering the lug 64, for example, best shown in Figs. 3, 6 and 12, it is rounded on its interior as illustrated, and accommodates the pivot member 69, to which is attached the abutment plate 70, carrying the abutment 71 proper, which in turn is provided with the pivot member 72, carrying the U-shaped member 73, having the ears 74.

The pistons 25, 26, 27 and 28 are each provided at the points of contact between the extremities of their major axes and the bore of the stator 7, with suitable longitudinally disposed packing 75, as will be clear from Figs. 6, 7, 8, 9, 11 and 12, while the U-shaped member 73, carried by the abutment 71, is likewise provided with similar packing 77, see Figs. 6 and 12.

The outer surface of the abutment 71 is curved as shown, and the said surface is packed by a suitable packing 78 which may be adjusted by the screws 79. The abutment plate 70 is likewise guided and packed on the one side by the perpendicular wall 80, formed integral with the lug 64 and casing 7, and on the other side by a similar wall 800, which, however, is made removable in order that the parts may be readily assembled and disassembled.

From the construction so far disclosed it is evident that as the piston 25 revolves the abutment 71 and its associated parts will rise and fall, oscillating about the pivot member 69 as a center, and in order that the said abutment may pass through the casing 7, the latter is provided with an opening 76, which fits and accommodates the said abutment, as is best shown in Figs. 6 and 12. It will further be clear from said figures that as the piston 25 revolves and the abutment 71 and its coacting parts rise and fall, the packing 77 and the ears 74 of the member 73 will continuously remain in contact with the outer surface of the said piston.

As will be readily understood from an inspection of the drawings two oppositely disposed abutments are provided for each piston. Those coacting with piston 25 being lettered 71 and 840 see Fig. 6, those coacting with piston 26 being lettered 851 and 870 see Fig. 7, and those coacting with piston 27 being lettered 861 and 871 see Fig. 8, while those coacting with piston 28 are lettered 710 and 850, see Fig. 9.

As is best shown in Figs. 1, 2, 3, 5, 6, 7 and 10 of the drawings, I provide four levers 82, 85, 820 and 860 coacting with the said eight abutments. The said levers are preferably of the forms illustrated, and fulcrumed respectively in suitable posts 83, 183, 283 and 383, rigid with the casing 7.

The ends of said levers 82, 85, 820 and 860 are each provided with an anti-friction ball such as 81, the balls of the lever 82 contacting with the outer surfaces of the abutments 71 and 710; those of the lever 85 contacting with the outer surfaces of the abutments 870 and 871; those of the lever 820 contacting with the abutments 840 and 850, while those of the lever 860 contact with the abutments 851 and 861, see Figs. 1, 3, 6, 7, 8 and 9.

It being remembered that the pistons 25 and 28 are at substantially right angles to one another, as above disclosed, it will be clear that when the piston 25, for example, forces its abutments 71 and 840 outwardly, the said abutments will in turn force outwardly the coacting ends of the levers 82 and 820, respectively. The said levers will then fulcrum in their respective posts 83 and 283 and their other ends will be forced inwardly, carrying with them their respective abutments 710 and 850 contacting with the piston 28. The converse is equally true, because the forcing out of the abutments 710 and 850 by the piston 28, will result in the forcing in of the abutments 71 and 840 against the piston 25. The same operation holds good with regard to the pistons 26 and 27 and their associated levers 85 and 860, and their corresponding abutments 870, 871, and 851, 861 respectively.

It follows from what has just been stated that the packings, such as 77, carried by the abutments, such as 71, will always be maintained in contact with the surfaces of the pistons such as 25, 26, 27, and 28 and leakage will be thereby prevented. Suitable springs, such as 84, 87, 830 and 860, may be provided to take up any lost motion due to inequalities in the piston surfaces.

Fuel is admitted to the compression chambers 31 and 310, see Fig. 6, from any suitable carbureter or other mixing device through pipes 100 and 101, leading respectively through ports 90 and 91 into chambers such as 115 and 116 under the abutment plates 70 and 841, from whence it is sucked as needed by the receding sides of the piston 25 through ports 139 and 140 in the casing 7 into the said chambers 31 and 310. In a like manner fuel is sucked into the compression chambers 34 and 340 by the piston 28 through the ports 141 and 142 from the chambers 117 and 118, which are supplied from the carbureter by the pipes 102 and 103, respectively, see Figs. 1, 3 and 9.

The burnt gases in the explosion chambers 32 and 320 are exhausted respectively through ports 143 and 144, chambers 119 and 120 and pipes 104 and 105, see Figs. 1, 5 and 7, while the exhaust from the explosion chambers 33 and 330 is through ports 145 and 146, chambers 121 and 122 and pipes 108 and 109, respectively, see Figs. 1, 5 and 8.

After the initial explosion the ignition of the compressed gas is entirely automatic, as will be more fully explained below, but in order to secure such an initial explosion I provide a suitable ignition means such as 155, Fig. 7, adapted to project a flame in close proximity to a port or opening 156 in the casing 7. The said port 156 is located beneath a hood or shield 1560 and is adapted to be closed by a suitable valve 157.

The operation of the engine will be clear from the foregoing but may be briefly summarized as follows:—

Supposing the parts to be in the positions illustrated in Figs. 2, 4, 6, 7, 8, 9 and 10 and that a fuel mixture is being supplied by a carbureter to the chambers 115, 116, 117 and 118 through the pipes 100, 101, 102 and 103 respectively, such fuel mixture will pass through the ports 139 and 140 and will fill the portions of the chambers 31 and 310, see Fig. 6 which lie respectively between the abutments 71 and 840 and the extremities 250 and 251 of the piston 25.

The rotor 5 now being revolved by hand in the direction indicated by the arrow in said Fig. 6, the extremities 250 and 251 will recede from the abutments 71 and 840, respectively and will suck additional fuel into the chambers 31 and 310. This will continue until the extremities 250 and 251 reach the abutments 840 and 71 respectively, when the chambers 31 and 310 will be filled with gas at approximately atmospheric pressure.

As soon as the extremities 250 and 251 of the piston 25 respectively pass the said abutments 840 and 71, the said extremities will begin to compress the gas trapped in the chambers 310 and 31 against the respective abutments and such compression will continue until the parts have reached a position approximately 180° from that illustrated in Fig. 6. That is to say, the extremities 250 and 251 will have reached a position exactly reversed from that shown in said figure.

At this point the pair of ports 147 and 150 will register with the port 51 of the ring member 35 and the pair of ports 148 and 152 will register with the port 50 of said ring member and the compressed gas will be discharged through said ports from the chamber 310 into the chamber 320 and from the chamber 31 into the chamber 32 respectively.

The cycle of suction and compression just described will be repeated upon the further rotation of the rotor through the next 180°, and it will thus be seen that there will be two suctions and two compressions on each side of the piston 25 for each revolution thereof.

Further, the piston 28 goes through exactly the same said cycle of suction and compression at 90°, or a quarter revolution, behind the piston 25, and it discharges its compressed gas through the ports 54, 55, 175, 176, 177 and 178 into the explosion chambers 33 and 330 associated with the piston 27, see Fig. 4.

The firing of the charges of compressed gas in the explosion chambers is accomplished as follows:—

Referring to Figs. 4, 7 and 8 and assuming for the sake of clearness that the rotor, instead of having been rotated only 180° as above described, has made a complete revolution of 360° and has thus brought the parts back to the positions illustrated in the said figures, the extremity 260 of the piston 26 will be about to uncover the firing port 156. As soon as the extremity 260 uncovers the said port 156 the flame from the ignition means 155, will ignite the compressed fuel in that portion of the chamber 32 which at the time lies between the extremity 260 and the abutment 870. The expanding gases resulting from the explosion of the compressed fuel just described will act against the abutment 870 and upon the piston 26, and will revolve the latter in a counter-clockwise direction, as indicated by the arrow in Fig. 7.

The valve 157, controlling the firing port 156 now closes and may be secured in such position by any suitable means, not shown, in order that none of the force of the succeeding explosions will be lost. The flame of the ignition means 155 may also be extinguished or reduced to a pilot light, since after the initial explosion, the ignition of the compressed gases is automatically carried on entirely within the casing 7, as will now be disclosed.

It being remembered that the chambers 32 and 320 were simultaneously charged with compressed gas, upon an explosion taking place in the chamber 32, the piston 26 will be rotated as above described, until the ends 430 and 431 of the passage 30 have passed the abutments 870 and 851, respectively. The burnt gases in the chamber 32 will then pass through the said passage 30, and explode the fresh gas in the chamber 320, thus imparting an additional impulse to the piston 26. Much of the force of this initial explosion in the chamber 320 will of course be lost due to the fact that the pressure of the gas in the said chamber has been greatly lowered by the rotation of the piston 26. After such initial explosions, however, the gas in the chambers 32 and 320 will not be fired through said passage 30, but will be fired simultaneously at the point of its greatest compression through other passages, as will presently appear.

Upon continued rotation of the piston 26, the pairs of ports 161 and 165 and 163 and 167 will respectively register with the ports 53 and 52 of the ring member 36, see Fig. 4, whereupon a small portion of the burnt gases in the chambers 32 and 320 will pass through the said registering ports to the chambers 33 and 330, respectively. The said burnt gases will then simultaneously explode the charges of fresh gas which has been supplied the said chambers 33 and 330, by the piston 28 and its associated parts, as above disclosed.

That is to say, from an inspection of Fig. 4 it will be clear that just before the ports 163 and 167 register with the port 52, the ports 176 and 178 will have registered with the port 54. Fresh gas under pressure will thus have been furnished by the piston 28 from its chamber 34 through the said ports 176, 54 and 178 to the chamber 330 just before the admission of the hot gases from the chamber 320 through the ports 163, 52 and 167, as above described. The same is of course true of the opposite extremities of the respective pistons and their coacting parts in that fresh gas will have been furnished to the chamber 33, through the ports 177, 55 and 175 from the chamber 340, just before the burnt gases from the chamber 32 are admitted to the said chamber 33 through the ports 161, 53 and 165.

It will thus be seen that after the initial explosions in the chambers 32 and 320, all ignitions take place at approximately the maximum compression of the fuel, which results in a high efficiency of operation.

The subsequent ignition of the gas in the chambers 32 and 320 is accomplished in substantially the reverse way from that disclosed in connection with the chambers 33 and 330. That is to say, the chambers 32 and 320 are now fired by portions of the hot gases from chambers 33 and 330 when the pairs of ports 162 and 166 and 164 and 168 register with the ports 53 and 52. The inter-firing between the explosion chambers will of course continue as long as fuel is supplied by the carbureter.

The burnt gases in the chamber 32 will, of course, continue to expand until the extremity 260 of the piston 26 uncovers the exhaust port 144, whereupon the said burnt gases will be forced out through the said port 144 by the advancing extremity 261, into the chamber 120 and from thence to the exhaust pipe 105. Likewise the burnt gases in the chamber 320 will be forced through the port 143 by the advancing extremity 260, into the chamber 119 and exhaust pipe 104.

In like manner the burnt gases in the chambers 33 and 330 will be forced by the extremities 270 and 271 respectively of the piston 27, through the exhaust ports 145 and 146 into the chambers 121 and 122 and the exhaust pipes 108 and 109.

The form of the invention illustrated in Figs. 1 to 13 is capable of rotation in one direction only, but should it be desired to reverse the direction of rotation of the rotor, such result may be accomplished by means of the modification diagrammatically shown in Fig 14. In such modification the chamber 31 is adapted to communicate at predetermined times with the chamber 32, through the movable port 500 and the stationary port 501. The chamber 32 is likewise adapted to communicate with the chamber 33 through the movable port 502 and the stationary port 503, while communication between the chambers 33 and 34 is afforded by the similar ports 504 and 505.

In addition to the above passages or ports, a passage 506 is provided in the casing 7, adapted to register at predetermined times with ports 507, carried by the rib 16, and 508 carried by the rib 18, and to thus afford communication between the chambers 31 and 34. A suitable valve 509 is provided to control the passages 506 and 503, so that when one of said passages is open the other will be closed and vice versa.

It will of course be understood that there are two passages such as 506, arranged at diametrically opposite points on the stator 7, said passages coacting with four ports such as 507 and with four other ports such as 508, in substantially the same manner as the ports 52 and 53 coact with the ports 161 to 168, above described in connection with Figs. 1 to 13. In like manner there is a passage similar to 503 diametrically opposite thereto and a valve similar to the valve 509 to control the said last mentioned passages similar to 503 and 506.

When the valves such as 509 are so turned as to open the passages 503 and to close the passages 506, the operation of the motor will be the same as was above disclosed in connection with Figs. 1 to 13. That is to say the chambers 31 and 34 will operate as compression chambers and the chambers 32 and 33 will operate as explosion chambers, the gas charges in the said explosion chambers being fired back and forth between the said chambers through the ports 502 and 503.

On the other hand, when the valves such as 509 are so turned as to close the passages 503 and to open the passages 506, the chambers 32 and 33 will become compression chambers and the chambers 31 and 34 will become explosion chambers, firing back and forth through the passages 506 and ports 507 and 508.

It will of course be understood that a suitable valve mechanism must be provided to control the set of fuel supply pipes and that a similar mechanism should be provided to control the set of exhaust pipes, so that the said sets of pipes may be alternately connected at will with either the chambers 31 and 34 or with the chambers 32 and 33. Any suitable valve mechanism may be used, however, and as such mechanism forms no part of the present invention it has not been illustrated.

When the chambers 31 and 34 are used as explosion chambers, as above stated, the direction of the rotation of the rotor will be reversed, due to the fact the pistons coacting with the said chambers occupy a reversed position relative to their respective abutments as compared to the pistons coacting with the chambers 32 and 33, see Figs. 6, 7, 8 and 9. Further, the abutments of the said chambers 31 and 34, are themselves reversed as compared to the abutments of the chambers 32 and 33, as will be clear from the said figures.

In the form of the invention shown in Fig. 15 the ring members 35, 36 and 37 of the stator, instead of being made separate and removable, are cast integral with the said stator, and are provided with cooling spaces 515 for the circulation of cooling air.

In Fig. 16 the ring member is shown as being provided with a groove 517 adapted to receive a flange 518 with which the rotor 5 is provided, while in Fig. 17 both the rotor and the stator are provided with a single contacting flange 520 and 521 respectively, carrying the registering ports. In Figs. 18 and 19 the bore of the stator is uniform and said stator is provided with grooves 525 adapted to receive the flanges or ribs 526 with which the rotor is provided.

In all the forms shown in Figs. 15, 16, 17, 18 and 19 it will of course be necessary to make the stator 7 in two parts and to secure the same together after the rotor has been placed therein, as it will be impossible to insert the rotor from the end, as is contemplated in the forms shown in Figs. 1 to 14.

It is obvious that those skilled in the art may vary the details of construction as well as the arrangement of parts without departing from the spirit of my invention and therefore I do not wish to be limited to the above disclosure except as may be required by the claims.

What I claim is:

1. In a gas engine the combination of a stator, a rotor having a plurality of ribs provided with recesses; packing material carried by said ribs on each side of said recesses; crescent shaped cut-away portions forming elliptical pistons between said ribs; and stationary rings associated with the interior of said stator and fitting said recesses, each of said stationary rings being provided with a pair of diametrically disposed ports, and each rib being provided with a pair of diametrically disposed ports on each side of its corresponding ring adapted to register simultaneously at predetermined times with said first named ports, substantially as described.

2. In a gas engine the combination of a stator; a rotor having a plurality of annular ribs provided with annular recesses; stationary rings provided with diametrically disposed passages fitting said recesses; each of said ribs also provided with ports on each side of each ring adapted to simultaneously register with said passages at predetermined intervals; said rotor provided with angularly displaced pairs of crescent shaped cut-away portions located between said ribs to form angularly displaced elliptical pistons; and a pair of pivotally mounted abutments adapted to fit each piston and pair of cut-away portions, substantially as described.

3. In a gas engine the combination of a stator; a rotor having a plurality of annular ribs provided with annular recesses; and with a packing ring on each side of each recess; stationary rings provided with diametrically disposed passages fitting said recesses; said ribs also provided with ports on each side of said rings, adapted to simultaneously register with said diametrically disposed passages at predetermined intervals; said rotor provided with angularly displaced pairs of crescent shaped cutaway portions located between said ribs to form angularly displaced elliptical pistons; means to admit fuel to some of said cutaway portions; means for exhausting burnt gases from the other cutaway portions; and a pair of pivoted abutments for each piston, substantially as described.

4. In a gas engine the combination of a stator provided with orifices; a rotor having a plurality of angularly displaced elliptical pistons; said rotor provided with packing rings and an annular recess between each pair of pistons; a pair of pivoted abutments for each piston passing through said orifices and normally contacting with opposite sides of said pistons; spring controlled levers governing said abutments in pairs; stationary rings coacting with said stator and located in each annular recess between each pair of pistons, the parts forming a pair of elliptical chambers associated with each piston and pair of abutments; and means comprising diametrically disposed passages through said rings and ports through said ribs for permitting gas at predetermined times to flow from one pair of chambers to an adjacent pair of chambers, substantially as described.

5. In a gas engine the combination of a stator; a rotor provided with a pair of annular ribs having annular recesses; a stationary packing ring in each recess; a passage at diametrically opposite points in said ring; a pair of ports in each rib adapted to simultaneously register with each passage; a pair of angularly disposed pistons rigid with said rotor; a pair of pivoted abutments for each piston; the parts adapted to form a compression chamber for each piston; a duplicate pair of annular ribs; a duplicate pair of pistons; a duplicate pair of abutments; said duplicate parts forming an explosion chamber for each of said last named pistons; a spring controlled lever for governing said abutments in pairs; and means for exhausting burnt gases from said explosion chambers, substantially as described.

6. In an explosive engine the combination of a stator; a rotor provided with a plurality of annular ribs having annular recesses; stationary rings in said recesses; angularly displaced pistons associated with said ribs; a pair of pivoted abutments associated with each piston; a spring controlled lever for governing said abutments in pairs; diametrically disposed passages through each ring; a pair of ports carried by each rib adapted to simultaneously communicate with each passage; the parts being so disposed as to form a plurality of explosion chambers; a plurality of compression chambers; communicating means adapted to feed fuel at a predetermined time from one of said compression chambers to one of said explosion chambers; communicating means adapted to feed fuel at another predetermined time from another of said compression chambers to another of said explosion chambers; means for firing the fed fuel in one of said explosion chambers at a predetermined time; means for firing the fed fuel from another of said explosion chambers at another predetermined time; and means for exhausting the burnt gases from all of said explosion chambers; substantially as described.

7. In a gas engine the combination of a stator provided with orifices; a rotor having a plurality of angularly displaced elliptical pistons; a pair of abutments for each piston passing through said orifices and normally contacting with opposite sides of said pistons; levers controlling the movements of said abutments in pairs; a stationary ring coacting with said stator and located between each pair of pistons, the parts forming a pair of chambers associated with each piston and pair of abutments; and means permitting gas at predetermined times to flow from one pair of chambers to an adjacent pair of chambers, substantially as described.

8. In a gas engine the combination of a stator; a rotor in said stator; a pair of angularly displaced pistons rigid with said rotor; a pair of abutments for each of said pistons; a pair of levers joining said abutments in pairs, the parts being so disposed as to form a pair of compression chambers; means for admitting fuel to said compression chambers; a second pair of angularly disposed pistons, the parts being so disposed as to form a pair of explosion chambers associated with each of said last named pistons; and means for exhausting burnt gases from said explosion chambers, substantially as described.

9. In a gas engine the combination of a stator; a rotor in said stator; a pair of angularly displaced pistons rigid with said rotor; a pair of abutments for each of said pistons; a pair of levers joining said abutments in pairs, the parts being so disposed as to form a pair of compression chambers; means for admitting fuel to said compression chambers; a second pair of angularly disposed pistons, the parts being so disposed as to form a pair of explosion chambers associated with each of said last named pistons; a pair of abutments for each of said last named pistons; a second pair of levers controlling the movements of said last named abutments; and means for exhausting burnt gases from said explosion chambers, substantially as described.

10. In a gas engine the combination of a pair of compression chambers; a pair of explosion chambers; communicating means between one of said compression chambers and one of said explosion chambers; communicating means between the other of the said compression chambers and the other of the said explosion chambers; a piston associated with each of said chambers, each of said pistons being angularly displaced with regard to the others; and communicating means between said explosion chambers, substantially as described.

11. In a gas engine the combination of a pair of compression chambers; a pair of explosion chambers; communicating means between one of said compression chambers and one of said explosion chambers; communicating means between the other of the said compression chambers and the other of the said explosion chambers; said last named communicating means being angularly displaced with reference to the said first named communicating means; a piston associated with each of said chambers, each of said pistons being angularly displaced with regard to the others; and communicating means between said explosion chambers so positioned with respect to said other communicating means as to allow the passage of igniting gases from the chamber in which an explosion has taken place to the chamber that has been filled with compressed fuel.

12. In a gas engine the combination of a pair of duplicate compression chambers, a pair of duplicate explosion chambers; communicating means between one of said sets of compression chambers and one of said sets of explosion chambers; communicating means between the other of the said sets of compression chambers and the other of the said sets of explosion chambers; a piston associated with each of said sets of chambers, each of said pistons being angularly displaced with regard to the others; and communicating means between said sets of explosion chambers, substantially as described.

13. In a gas engine the combination of a stator provided with a plurality of lugs on its exterior; plates pivoted to said lugs; abutments carried by said plates having associated therewith packed members adapted to contact with pistons; levers pivoted to said stator adapted to control said abutments in pairs; and an adjustable packing carried by said stator for each abutment substantially as described.

14. In a gas engine the combination of a stator provided with orifices and a plurality of lugs on its exterior; plates pivoted to said lugs; abutments passing through said orifices, carried by said plates and having associated therewith packed members adapted to contact with pistons; levers pivoted to said stator adapted to control said abutments in pairs; and an adjustable packing carried by said stator for each abutment, substantially as described.

15. In a gas engine the combination of a stator provided with a plurality of lugs on its exterior; plates pivoted to said lugs; abutments carried by said plates having associated therewith packed members adapted to contact with pistons; an adjustable packing carried by said stator for each abutment; a port through said stator under each plate; means to convey fuel to certain of said ports; and means to carry away from the other of said ports the burnt gases, substantially as described.

16. In a gas engine the combination of a rotor provided with a plurality of pistons; ribs provided with recesses between the pistons; segmental rings fitting said recesses; and tapered means fitting between the segments of the rings to expand the latter, substantially as described.

17. In a gas engine the combination of a stator; a rotor provided with a plurality of pistons; ribs provided with packing rings fitting the interior of said stator and with recesses between the pistons; segmental rings fitting the interior of said stator and said recesses; and tapered means carried by said stator fitting between the segments of the rings to expand the latter, substantially as described.

In testimony whereof I affix my signature, in presence of two witnesses.

LEO B. THOMAS.

Witnesses:
RICHARD C. ADDY,
BERNARD RING.